UNITED STATES PATENT OFFICE.

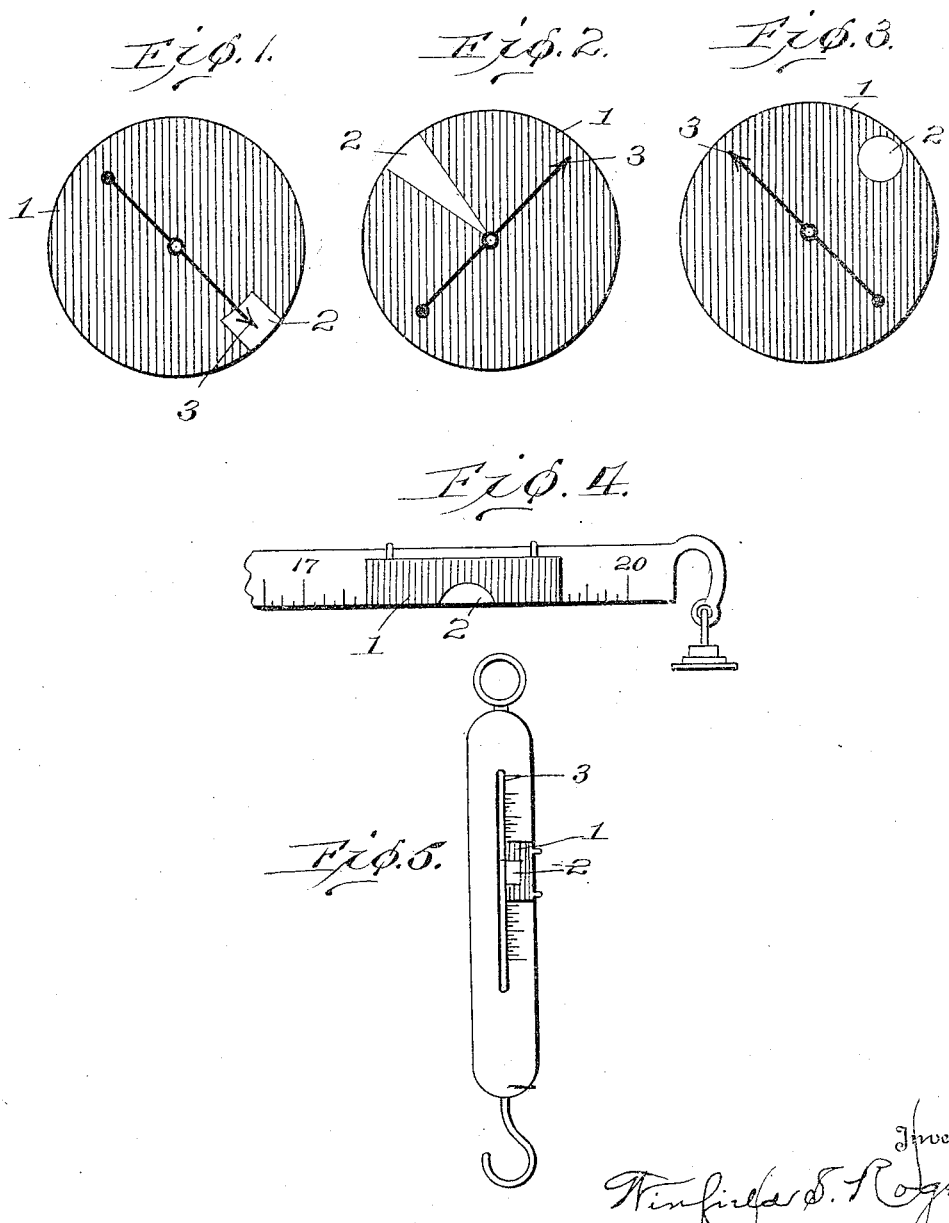

WINFIELD S. ROGERS, OF BANTAM, CONNECTICUT.

INDICATING DEVICE.

1,293,935.  Specification of Letters Patent.  Patented Feb. 11, 1919.

Application filed October 17, 1917.  Serial No. 197,091.

*To all whom it may concern:*

Be it known that I, WINFIELD S. ROGERS, a citizen of the United States, residing at Bantam, in the county of Litchfield and State of Connecticut, have invented certain new and useful Improvements in Indicating Devices, of which the following is a specification.

This invention relates to indicating devices, such as are employed on gages, weighing and measuring means and instruments of precision, particularly to micrometers, and has for an object a simple and reliable means for indicating, without numerals or other marks, a predetermined maximum and minimum of tolerance.

The usual means for effectuating this object is by the readings upon a dial or other field; such readings are often obscure, confusing and misunderstood, and therefore unreliable. By this improved method it is possible to selectively set the dial or other field in such a way that a certain portion thereof shall be visually accentuated and serve as a limitation to the operator thereof.

To this end, I use a disk, card, or other suitable field in the place of the customary dial, scale, graduate or rule, such disk being devoid of the usual marks or numerals, but having a segment or other portion thereof delineated in a distinctive color or simply outlined as a guide. When the hand or pointer of any instrument so equipped enters this visually accentuated zone it is evident to the operator that the predetermined minimum has been reached; if the pointer goes beyond the said zone he sees that the maximum has been exceeded; by the same signs he clearly determines whether or not the pointer rests within the stipulated zone. Thereby, the person operating the instrument may be relieved of responsibility and of the necessity for reading the minute figures and delicate lines on a precision instrument; and one untutored in letters and figures may as ably and accurately employ the device as could a skilled geometrician. Other objects and advantages will appear from the following description and drawings.

Figure 1 is a perspective of the face of a gage embodying one phase of the invention, Figs. 2 and 3 are modifications of the same, Fig. 4 shows a scale-beam with the invention applied thereto, and Fig. 5 shows a further modification of the same applied to a spring-balance. In the drawings, 1 represents the field which is employed in place of the customary graduated dial; 2 is the distinctively marked portion thereof, and 3 is the pointer or hand with which such instruments are usually equipped.

My invention broadly consists in a dial or other field, susceptible of adjustment to instruments of various kinds, whereby it may be so placed as to furnish indicia to the user regarding the limits between which certain predetermined standards exist. For instance, if material .003″ in thickness is required, with a tolerance of .0002″ above and below this point, it is possible to set a micrometer gage, by the use of standard samples, so that the testing of materials may be conducted by the use of ordinary visual sense, just as accurately as by mathematical calculation, and at a considerable economy of time, and by unskilled labor. The same or similar advantages will be apparent when applied to the whole catalogue of measuring and testing instruments, wherever either absolute or approximate standards are prescribed. Such a dial or field as is herein described may be locked in place by any suitable means, to insure permanent accuracy and to prevent tampering therewith. Modifications may be made in the construction shown, within the principle and spirit of my invention.

I claim:

1. An indicating device comprising an indicating element, and an indicator face having thereon only a distinctively marked portion to indicate a predetermined zone within the limits of which the indicating element registers.

2. In an indicating device, an adjustable indicator face, having thereon only a distinctively marked portion to indicate a predetermined zone within which the indicating element should register.

In testimony whereof I have affixed my signature.

WINFIELD S. ROGERS.

Copies of this patent may be obtained for five cents each, by addressing the "Commissioner of Patents, Washington, D. C."